(Model.)　　　　　　　　　　　　　　　　　　2 Sheets—Sheet 1.
B. M. ROOT.
FEED FOR FERTILIZER DISTRIBUTERS.

No. 512,906.　　　　　　　　　Patented Jan. 16, 1894.

Witnesses:　　　　　　　　　　　　　　　Inventor
　　　　　　　　　　　　　　　　　　　　Benjamin M. Root.
　　　　　　　　　　　　　　　　　　by
　　　　　　　　　　　　　　　　　　　　his atty.

(Model.)  2 Sheets—Sheet 2.

B. M. ROOT.
FEED FOR FERTILIZER DISTRIBUTERS.

No. 512,906. Patented Jan. 16, 1894.

Witnesses:
J. W. Coleman
E. A. Fincuel

Inventor
Benjamin M. Root.
by Wm. N. Fincuel
his atty

UNITED STATES PATENT OFFICE.

BENJAMIN M. ROOT, OF YORK, PENNSYLVANIA.

FEED FOR FERTILIZER-DISTRIBUTERS.

SPECIFICATION forming part of Letters Patent No. 512,906, dated January 16, 1894.

Application filed October 5, 1893. Serial No. 487,264. (Model.)

*To all whom it may concern:*

Be it known that I, BENJAMIN M. ROOT, a citizen of the United States, residing at York, in the county of York and State of Pennsylvania, have invented a certain new and useful Improvement in Feeds for Fertilizer-Distributers, of which the following is a full, clear, and exact description.

This invention relates to those devices used in fertilizer distributers for ejecting the fertilizer in regulated quantities, and one object of the invention is to provide means for keeping the fertilizer in condition to be ejected, and another object is to provide an improved form of gate for regulating the size of the exit and, consequently, the quantity of fertilizer ejected.

The principle of my invention as illustrated in the accompanying drawings, is shown as applied to that class of fertilizer feeds which have the exit at one side rather than at the bottom; and the devices for ejecting the material are stirrers arranged at the upper portion of the mass of material, other stirrers arranged just above the discharge or exit, and still other stirrers arranged in the plane of the mouth of the exit, whereby the mass of fertilizer material is kept in a state of agitation, as it were, and thereby prevented from caking or agglomerating and its ejection from the hopper insured. The several stirrers are arranged upon a common spindle, and to them a rotary motion is imparted. The gate which is arranged in the mouth of the exit or discharge is in the form of a segment of a cylinder, terminating at one end in lateral flanges and at the other end in adjusting mechanism, and pivoted in such a manner as to be capable of being moved crosswise of the mouth of the discharge exit so as to contract or enlarge the said mouth in accordance with the quantity of fertilizer desired to be fed.

Having thus stated the principle of my invention, I will proceed now to describe the best mode in which I have contemplated applying that principle, and then will particularly point out and distinctly claim the part or improvement which I claim as my invention.

Figure 1:
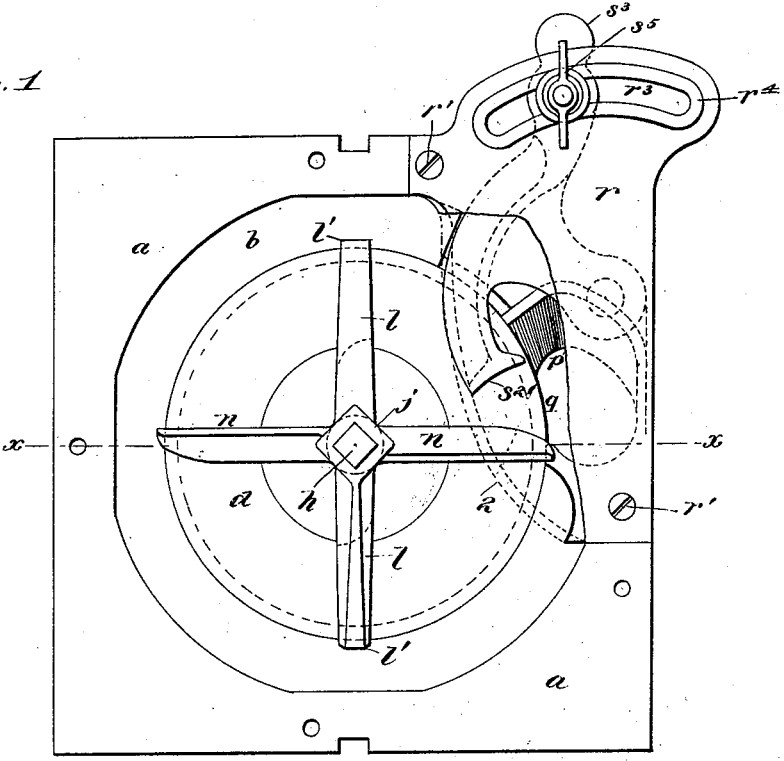
Figure 2:
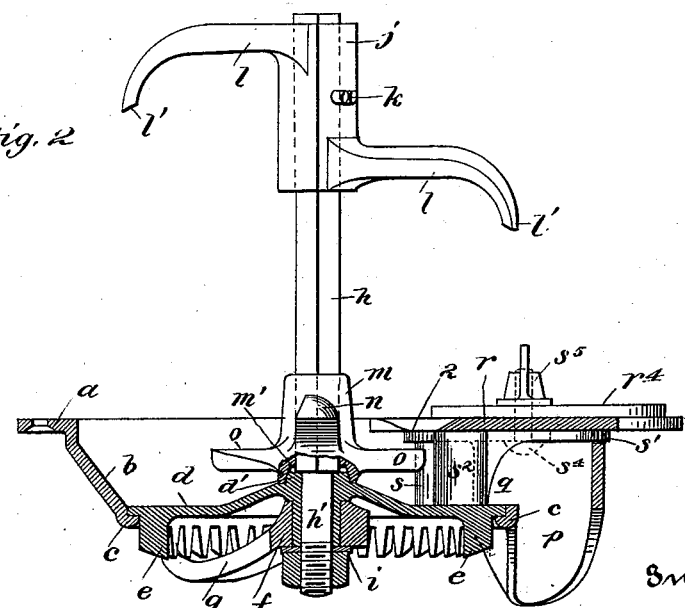
Figure 3:
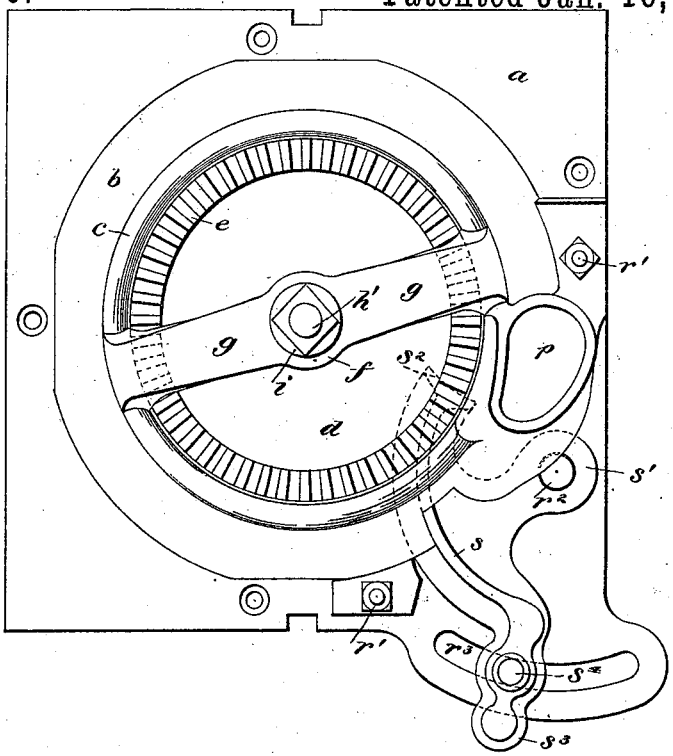
Figure 4:
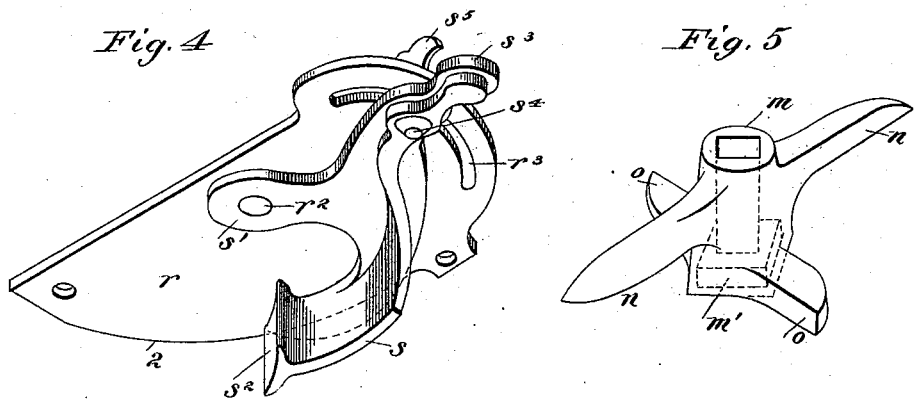
Figure 5:
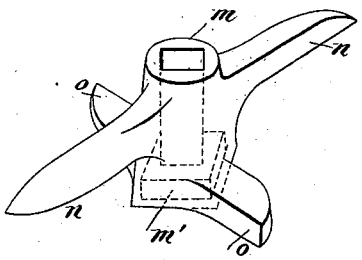

In the accompanying drawings illustrating my invention, in the several figures of which like parts are similarly designated, Figure 1 is a top plan view with a portion of the exit cover broken out. Fig. 2 is a vertical section taken in the plane of line $x$—$x$, Fig. 1, but with the stirrer spindle given a quarter turn from the position shown in Fig. 1. Fig. 3 is a bottom plan view. Fig. 4 is a perspective view of the gate mechanism detached; and Fig. 5 is a perspective view of the lower stirrers.

The hopper, the supporting frame therefor, and the other parts constituting the framework, &c., of a fertilizer distributer may be as usual. The bottom of the hopper is provided with a metal bed plate $a$, the center of which is depressed to form an annular bottomless cup $b$, and this cup is made with flanges $c$ to receive the rotary feed disk $d$, provided with spurs or gear teeth $e$, by which the said feed disk may be rotated, as usual. This feed disk is further supported by its hub $f$ in a bearing in a spider $g$ cast with or attached to the cup $b$.

$h$ is a spindle, preferably square, and having a rounded end $h'$ which fits in a round hole in the hub $f$ of the feed disk and is secured in place by means of a nut and washer $i$ applied to the screwthreaded end of the said part $h'$. The upper end of the spindle $h$ is provided with a casting $j$ fitted thereto, as by a split key $k$, and having at different altitudes and preferably at opposite sides the horizontally extending stirrer arms $l$, and these stirrer arms, by preference, have their outer ends $l'$ turned down or into substantially vertical planes, so as not only to agitate the mass in horizontal but also in vertical planes at the upper surface of such mass of fertilizer in the hopper, thereby preventing the agglomeration of the fertilizer in their vicinity. Another casting $m$ is secured to the spindle $h$ at its lower end, and this casting, as shown more particularly in detail in Fig. 5, comprises the two diametrically-opposite stirrer arms $n$, the plane of motion of which is the top of the cover of the discharge mouth, as will presently appear, and two other diametrically-opposite and shorter stirrer arms $o$, whose plane of motion is in the mouth of the discharge opening, as will presently appear. This casting $m$ is provided with an internal angular socket $m'$, which receives a correspondingly angular projection $d'$ from the feed disk $d$, so as to cause the spindle $h$ to revolve with the feed disk, although, as is obvious, other connections may be made whereby the spindle will revolve with the feed disk. It is obvious that the castings $j$ and $m$ will be fitted to the spindle in such manner as to revolve with the said spindle.

$p$ is the discharge opening and opposite the letter $q$, Fig. 2, is the mouth leading from the feed disk into this discharge opening, the said mouth being made in the cup $b$ as clearly shown in Figs. 1 and 2. The discharge $p$ and mouth $q$ are covered by a detachable cover-plate $r$ secured to the bed-plate $a$ by bolts $r'$, or other suitable fastenings; and the said cover projects into the feed and overhangs the feed disk $d$ substantially in the manner and to the extent indicated by the dotted line 2 in Fig. 1, and as particularly indicated in the section in Fig. 2.

The gate $s$ is made as a segment of a cylinder and is provided with a radius piece $s'$, which has its rotating center upon a lug $r^2$ projecting from the bottom of the cover-plate $r$. The inner end of the gate $s$ is provided with a flange $s^2$ projecting at an angle from opposite sides of the body of the gate and thereby adapted to stand crosswise of the mouth of the discharge opening. The other end of the gate is provided with an operating device or handle $s^3$, which is supplied with a bolt $s^4$ and a butterfly nut $s^5$, which bolt passes up through a segmental slot $r^3$ in the cover-plate, and which butterfly nut is adapted to be turned down against an upwardly-projecting rim $r^4$ of the cover-plate to bind the gate in any given position. The gate projects through a suitable opening made in the cup $b$ and is adapted to be moved across the mouth of the discharge opening and in the direction of its length to contract and enlarge the said mouth in accordance with the quantity of fertilizing material desired to be fed or to close the said mouth entirely, if desired; and it will be observed in this connection that, inasmuch as the flange $s^2$ extends crosswise of this mouth, it will assist in discharging the fertilizer; or, in other words, will assist in the prevention of the clogging of the fertilizer in the discharge mouth.

The stirrers $n$ operate in a horizontal plane substantially parallel with the plane of the upper surface of the cover-plate $r$, while the stirrers $o$ operate in a horizontal plane located substantially midway between the top of the feed disk and the bottom of the cover-plate. Inasmuch as the stirrers $l$ operate upon the upper portion of the mass of fertilizer in the hopper, and the stirrers $m$ operate upon the fertilizer just above the discharge opening, and the stirrers $o$ operate upon the fertilizer at its point of discharge, it follows that the mass of fertilizer is kept in a state of agitation and its agglomeration incident to its natural cohesiveness, is prevented and the mass is kept constantly in a fit state to be readily and regularly fed or discharged from the hopper.

To facilitate the passage of the several stirrers through the mass of fertilizer, the leading edges of the said stirrers are brought to a knife edge, as it were, and in order to present the least possible resistance to the passage of the fertilizer, the edge of the cover $r$ which extends into the feed is also brought to an edge.

It will be observed that the gate and the cover-plate are connected so as to be removed together.

While I have shown the gate as applied to a single fertilizer feed and as being supplied with an adjusting device single to itself, it is obvious that if the feed be used in a hopper supplied with a series of feeds, then any obvious and usual connection of the several gates in the said hopper may be made so that all of the said gates may be operated similarly and simultaneously.

I have herein shown and described but one form of feed disk, but I wish it understood that I do not limit my invention to the particular form of feed disk shown. I wish it also to be understood as claiming, independently of the stirrer arms, the gate, and vice versa, since the stirrer arms and the gate may be applied to other forms of fertilizer feeds; nevertheless I have obtained very marked advantages in the distribution of fertilizing material by the combination in a fertilizer distributer of my form of stirrers and my form of regulating gate. The claims hereinafter made are meant to be construed in accordance with this statement of the nature and applicability of my invention in its several and combined features.

I am aware that fertilizer distributers have been provided with upper and lower stirrers, and I am also aware that fertilizer distributers have been provided with adjustable gates in their discharge mouths, and, therefore, I make no claim to such features, broadly considered; but—

What I claim is—

1. In a feed for fertilizer distributers having a lateral discharge mouth provided with a cover-plate, the combination with the rotary feed disk, of a spindle and stirrers, some of which stirrers are arranged to rotate in the plane of the mouth, others arranged to rotate in a plane parallel with the top of the cover of the mouth, and others arranged to rotate in the upper portion of the mass of material in the hopper, substantially as described.

2. In a feed for fertilizer distributers having a lateral discharge mouth, a pivoted gate constructed substantially as a segment of a cylinder and having one end provided with a flange adapted to extend crosswise of the discharge mouth and having its other end provided with adjusting mechanism, substantially as described.

3. In a feed for fertilizer distributers, the combination with the bed-plate, feed disk and discharge opening, of a cover-plate for said discharge opening, a gate for said discharge opening constructed as a segment of a cylinder and pivoted to said cover-plate and adapted to be adjusted in the discharge mouth and provided with means for holding it in adjusted position, substantially as described.

In testimony whereof I have hereunto set my hand this 4th day of October, A. D. 1893.

BENJAMIN M. ROOT.

Witnesses:
F. U. CAMPBELL,
HARRY P. MILLER.